United States Patent
Landolt

(10) Patent No.: US 9,290,328 B2
(45) Date of Patent: Mar. 22, 2016

(54) CONVEYING ARRANGEMENT FOR USE WITH A TRANSPORT MEMBER

(71) Applicant: Mueller Martini Holding AG, Hergiswil (CH)

(72) Inventor: Michael Landolt, Reiden (CH)

(73) Assignee: MUELLER MARTINI HOLDING AG, Hergiswil (CH)

( * ) Notice: Subject to any disclaimer, the term of this patent is extended or adjusted under 35 U.S.C. 154(b) by 0 days.

(21) Appl. No.: 14/292,574

(22) Filed: May 30, 2014

(65) Prior Publication Data

US 2014/0353120 A1 Dec. 4, 2014

(30) Foreign Application Priority Data

May 31, 2013 (CH) ...................................... 1044/13

(51) Int. Cl.
  *B65G 17/20* (2006.01)
  *B65G 21/22* (2006.01)
  *B65G 21/20* (2006.01)
  *B65G 13/00* (2006.01)
  *E01B 25/24* (2006.01)

(52) U.S. Cl.
  CPC ............ *B65G 21/2045* (2013.01); *B65G 13/00* (2013.01); *B65G 17/20* (2013.01); *B65G 21/22* (2013.01); *E01B 25/24* (2013.01)

(58) Field of Classification Search
  CPC ........ B65G 17/20; B65G 17/32; B65G 21/18; B65G 23/14; B65H 29/003; B65H 29/00; B65H 2405/5521
  See application file for complete search history.

(56) References Cited

U.S. PATENT DOCUMENTS

| | | | | |
|---|---|---|---|---|
| 3,822,011 A | * | 7/1974 | Braun et al. | 198/735.2 |
| 5,598,784 A | * | 2/1997 | Kubsik et al. | 104/111 |
| 5,960,938 A | * | 10/1999 | Clopton | 198/867.13 |
| 6,269,944 B1 | * | 8/2001 | Taylor | 198/860.2 |
| 6,283,038 B1 | * | 9/2001 | Mattila | 104/89 |
| 8,267,943 B2 | * | 9/2012 | Ferree | 606/139 |
| 2013/0001051 A1 | | 1/2013 | Oppliger et al. | |

FOREIGN PATENT DOCUMENTS

| | | | | |
|---|---|---|---|---|
| CH | 701855 A1 | | 3/2011 | |
| CH | 702278 A1 | * | 5/2011 | ............ B65G 21/22 |
| EP | 1029815 A1 | | 8/2000 | |
| WO | WO-99/33722 | | 7/1999 | |
| WO | WO-99/33730 | | 7/1999 | |
| WO | WO-99/33731 | | 7/1999 | |
| WO | WO-99/33732 | | 7/1999 | |
| WO | WO-2011/060560 A2 | | 5/2011 | |

* cited by examiner

*Primary Examiner* — Mark A Deuble
(74) *Attorney, Agent, or Firm* — Robert Kinberg; FisherBroyles, LLP

(57) ABSTRACT

A conveying arrangement is provided for a transport member for conveying product. The transport member traverses on rollers inside a conveying arrangement which includes a plurality of tunnel shaped guide channel segments connectable together via end flanges. A continuous opening is provided on the underside of each channel segment in a conveying direction to accommodate a device attached to the transport member to take over conveying of the product. Guide rail elements inside the channel segments support run surface elements which present a rolling surface for the transport member. At least one run surface element has an excess length, relative to the length of the guide channel segment. An adapter element including a transition piece is positioned at least in a region of a separating plane between adjacent flanges to present a planar transition for the rolling surface of the at least one run surface element.

24 Claims, 7 Drawing Sheets

CONVEYING ARRANGEMENT FOR USE WITH A TRANSPORT MEMBER

CROSS-REFERENCE TO RELATED APPLICATIONS

This application claims priority to Swiss Application No. 01044/13, filed May 31, 2013, the entire disclosure of which is incorporated herein by reference.

BACKGROUND OF THE INVENTION

1. Technical Field

The present invention relates to a conveying arrangement for use with a transport member for conveying printed products along a conveying section. The conveying arrangement includes guide channel segments which are connected to each other via flanges, are embodied tunnel-shaped in the conveying direction, and are provided, on the side opposite the transport member that traverses on rollers, with a continuous opening on the underside for a mechanism which takes over a direct and/or indirect conveying of the printed products along the conveying direction. Arranged on the inside of the guide channel segments and the flanges are guide rail elements which support run surface elements for the transport member.

2. Prior Art

According to the Swiss Patent No. CH701855 A1, the respective guide segments are provided at the plant with outside flanges on both ends. These outside flanges comprise centering elements, so one flange can be joined precisely fitting and practically without tolerances to the respective outside flange of an adjacent guide segment or a work station. During the production at the plant, it is furthermore ensured that the ends of the running surfaces of the channel segment, formed by a guide segment and the two outside flanges, are located in a precisely specified position with respect to the centering. A continuous, meaning a low-tolerance and smooth transition without kinks, is thus ensured at the lowest possible cost for the assembly at the location for joining a channel segment with the adjacent channel segment.

More specifically, the above Swiss patent discloses a "conveying arrangement with a guide channel (10) which comprises at least one guide segment (20) of a profile material and a conveying member (52) that is positioned inside the guide channel (10) and is driven in a conveying direction (F), for which running wheels (54) cooperate with running surfaces (56), characterized in that respectively one outside flange (16) is fixedly arranged on each end of the guide segment (20), that the outside flanges (16) comprise centering means (24) and are joined precisely fitting with an outside flange (16) of an additional guide segment (20) or a work station (18) via the centering means (24), as well as that the running surfaces (56) are in a precisely specified position, relative to the centering means (24), so as to ensure a continuous transition for the running surfaces (56) at the joining locations.

To further ensure a gap-free and smooth, continuous transition of the running surfaces 56 and the guide surfaces 50 at the joining location between one outside flange 16 and another one and/or with the work station 18, this Swiss patent proposes that the running surfaces 56 and, if applicable, also the guide surfaces 50 are positioned precisely in a defined, predetermined position, relative to the centering means 24. The tolerance for said position is preferably less than or equal to 0.02 mm, in particular less than or equal to 0.01 mm. To achieve this goal, the respective regions of the outside flanges 16 can be ground at the plant (paragraph 0037).

A continuous and smooth transition can also be achieved in this case in the region of the guide surfaces 50 and the running surfaces 56, from the guide segment 20 to the outside flange 16 (paragraph 0040), by using a grinding or other processing method at the plant.

It is obvious that this assumed precise fit cannot be achieved in all cases since it is explained in the specification that precautions are taken at the plant (see also paragraph 0040), e.g. with the aid of a grinding operation, to ensure that once the outside flange 16 is fixedly connected to the guide segment 20, the guide surfaces 50 and the running surfaces 56 assume a precisely defined position on the guide segment 20, relative to the centering means 24 of the outside flange 16. The joining plane 78 is furthermore advantageously processed so that the end 22 of the guide segment 20 rests precisely in the joining plane 78 that is defined by the outside flange 16 (paragraph 0042).

A guide arrangement is also disclosed in International Patent Publication No. WO2011/060560 A2 which comprises connecting elements that can be connected precisely positioned as a result of a form-locking engagement. For this, the connecting elements can already be affixed to the guide elements at the plant, so that the components consisting of guide element and connecting element can be pre-fabricated, using standard parts such as straight-line guide elements, curved guide elements and connecting elements. During the pre-fabrication at the plant, it is thus possible to ensure a smooth transition from the guide element to the connecting element. At the installation location, the pre-fabricated components, also referred to as channel segments, can be joined form-locking in the region of the contact surfaces for these connecting elements, which face each other along the end faces and extend approximately perpendicular to the conveying section, wherein as a result of the form-locking connection of the contact surfaces facing away from the respective guide elements, an automatic centering of the pre-fabricated components relative to each other takes place, thereby ensuring a smooth transition between the guide surfaces of the individual components that serve to guide the conveying chain. Within the scope of this document, in particular, it has been recognized that the additional expenditure resulting from the guide elements and connecting elements can be accepted without problem in view of the consequently achieved simplification of assembly at the assembly location since this simplified assembly results in a noticeable reduction in time for the final assembly.

The form-locking connection of the end contact surfaces can be achieved if one contact surface is provided with at least one projection and the other contact surface is embodied with at least one complementary depression and/or a recess which can accommodate the projection in a form-locking manner. The connecting elements generally comprise an essentially flat limit surface that faces the guide surface, as well as a contact surface extending approximately parallel to the flat limit surface, wherein the projection on the contact surface extends along the conveying section, approximately in the direction opposite the limit surface that is facing the guide element while the depression extends in the direction of the limit surface facing the guide element.

In summary, conveying arrangements, comprising a preferably continuously circulating conveying chain that is guided with the aid of a suitable guide arrangement along a conveying section, are used for transporting printed products between individual processing stations, such as inserting machines, addressing devices, adhesive application machines, and the like. In the process, the printed products are generally held by grippers and/or clamps mounted on the chain links and, if applicable, are released by the grippers at the processing stations. To ensure a continuous operation, the conveying chain is generally operated continuously circulating along the conveying section that is determined by the guide arrangement. The conveying section normally comprises straight and curved sections or channel sections, wherein the curved sections can be arranged within a horizontal plane, a vertical plane or a plane that extends at an angle either up or down. The conveying arrangement consequently must also comprise straight-line as well as curved guide channel sections which thus determine the curves of the conveying section.

The conveying section can extend over a length of 100 m or more and can thus extend over a complete production room in horizontal and vertical direction. The conveying arrangement which determines the conveying section therefore cannot be produced in one piece, but must be fitted together using individual guide elements that are connected with the aid of suitable means. Corresponding guide arrangements are described, for example, in the WO99/33731, the EP1029815 A1, the WO99/33722, the WO99/33732 and the WO99/33730.

During the assembly of the known guide arrangements, the individual guide elements are normally joined along the end faces and are fixedly connected with the aid of clamping devices that engage in the side walls of the guide elements.

During the installation of the individual guide channel segments, attention must be paid to ensure that a smooth and uninterrupted transition exists between the guide channel segments for guiding the run surface elements at the separating planes of the guide channel segments and the flanges, so as to guarantee a low-noise and low-wear operation. In many cases, the transitions at the separating planes are reworked, for example with a grinding operation to smooth them. However, even following such an additional processing, it can be observed in many cases that the operation of the conveying chain along the conveying arrangement is noisy and disquiet.

SUMMARY OF THE INVENTION

The invention is intended to solve this problem. An object of the invention is to provide a conveying arrangement which can correct the disadvantages of the prior art arrangements. It is furthermore an object of the invention to make available a conveying arrangement which can be used for operating transport members known from the prior art.

Accordingly, the conveying arrangement according to the invention is not restricted exclusively to the operation with a specially designed transport member.

A further object of the invention is to provide a conveying arrangement with a low-noise and low wear operation.

Proposed is a conveying arrangement to be used with a transport member for conveying printed products along a conveying direction, which conveying arrangement consists of guide channel segments connected with the aid of flanges. These segments are embodied tunnel-shaped in the conveying direction and are provided, opposite the transport member which traverses on rollers, with a continuous opening on the underside with a device suspended therefrom to take over a direct and/or indirect conveying of the products, such as printed products, along the conveying arrangement. Guide rail elements which support run surface elements oriented toward the transport member are arranged on the inside of the guide channel segments and the associated flanges. The guide channel segments and the associated flanges ensure that these run surface elements are equipped with at least one mechanism and/or at least one measure to ensure a continuous planar transition for the rolling surface that serves the transport member at the locations where the run surface elements are joined.

According to the invention, the measure may include designing at least one run surface element belonging to the guide channel segment with an excess length, as compared to the length of the respective guide channel segment, and the mechanism may include at least one adapter element in the form of a transition piece, at least in the region of a separating plane between the guide channel segment and the flange and/or between adjacent flanges.

The guide rail elements are at least arranged on a side wall of the guide channel segment and in the longitudinal direction of the guide channel segment and comprise support regions for accommodating run surface elements, wherein this refers at least to a force-locked connection.

The guidance of the transport member is basically configured such that on the side wall of the guide channel segment two support regions are arranged opposite each other and spaced apart for a first and a second run surface element. Two support regions for a third and a fourth run surface element are also arranged spaced apart on the opposite wall. Respectively adjacent to each of these support regions, additional support regions are arranged for a fifth and a sixth, as well as for a seventh and eighth run surface element for which the running surfaces are respectively arranged at a right angle to those of an immediately adjacent run surface element. For a better understanding of this configuration and the underlying roller operation, attention is directed to International Patent Publication No. WO2011/060560 A3, the content of which is incorporated herein by reference, wherein this document forms an integral part of the present specification.

With this type of design, however, it is not always necessary that each guide roller for the transport member is guided on each side by two guide rail elements which extend parallel in the conveying direction. Thus, if eight possible guide rail elements, respectively extending in pairs, are provided in clockwise direction, it is possible that only the first, third, fifth, seventh guide rail element is equipped with an actively guiding run surface element, so that the guide rollers of the transport member in that case are guided only via these four run surface elements. The guide roller in that case moves with some play, relative to the directly opposite arranged run surface elements. With this type of configuration, an integrative automatic press-on effect is thus achieved for the guide rollers, as compared to the active guidance of the run surface elements. For this, we refer to FIG. 14 of US2013/0001051 A1, the entire contents of which is incorporated herein by reference.

The length of a run surface element belonging to a guide channel segment extends at least past one end thereof. The run surface element thus has an excess length as compared to the guide channel segment and forms at least in part the continuous extension of the running surface within the connected flange, thereby ensuring that no interruption occurs in the rolling surface predetermined by the run surface elements in the region of the separating plane between the guide channel segment and the flange. This precautionary measure can be provided, if necessary, at both ends of the guide channel segment.

The aforementioned excess length of the run surface element, relative to the length of the guide channel segment, should advantageously correspond at least to the distance within the connected flange to an intermediary end stop. As a result, the excess length of the run surface element which extends over the separating plane between the guide channel segment and the flange does not cover the complete axial width of the flange and is position-stable as a result of the end stop.

Relative to the guide channel segment, the excess length of the run surface element which is directed toward the end stop in the flange can furthermore be realized as allowance which, following the installation of the channel segment and during operation, develops an additional positive and stabilizing effect for the run surface element, relative to the rollers for the transport member.

In the fully assembled state, meaning once the flanges are connected force-locking to the respectively embodied segment of the guide channel, an allowance of this type results in pressure being exerted onto the run surface element in the rolling direction, thereby causing a slight, uniform bulge within the respective length of the run surface element which can absorb or counter any wear or loosening thereof during the operation. That is to say, the guide rollers which are guided between the run surface elements are always guided with a full and also elastic guidance, thus allowing a low noise operation without vibrations when they roll off.

The final shape for this bulge is reached if the flange, which is also provided with an end stop, is mounted on the opposite side of the guide channel segment. This type of configuration results in a rolling surface for the run surface element which extends continuously and uninterrupted over the complete length of the guide channel segment, as well as the separating planes of the connected flanges, up to their end stops.

Thus, if an end stop within the flange is used, a transition section extending to the end of the flange remains which is bridged according to the invention with at least one adapter element, wherein this adapter element ensures a continuous, planar extension of the run surface element in rolling direction, even across the separating plane of the two adjacent flanges.

If the adjacent flanges are respectively provided with an end stop, the individually used adapter elements must be embodied so as to ensure not only the continuous, planar extension of the run surface element, starting with the end stop to the separating plane for the adjacent flanges, but additionally also the planar extension of the rolling surface beyond this separating plane, up to the end stop in the connected flange.

One option for realizing this is to extend the adapter elements beyond this transition section and to provide these adapter elements with a chamfer in the opposing direction in the region of the separating plane between two adjacent flanges, as seen in the rolling direction. A chamfer of this type can also be provided on the run surface elements in the region of the respective end stop in the flange.

The adapter elements positioned in a mirror-image arrangement in the region of the separating plane between adjacent flanges thus not only can be provided with a chamfer at a right angle to the course of the run surface elements, but these chamfers can furthermore be embodied at an angle to match the complementary, angled adapter elements. With such a configuration, the tips of the angled adapter elements extend alternately into the transition section of the connected flange.

The adapter element can also consist of at least two operatively connected transition segments which cover the transition sections of adjacent flanges, parallel in the running direction, wherein the total width of these transition segments corresponds approximately to the width of the run surface elements that adjoin the respective end stop. Each transition segment within a transition section has at least one chamfer on the end, wherein the chamfer of a transition segment is side-reversed and pointing in opposite direction, relative to the adjacent transition segment.

Two-part transition segments of this type, which are respectively anchored at least force-locking in the flange, can be extended past the separating plane and up to the end stop of the adjacent flange, thus ensuring that the transition sections of both flanges form an uninterrupted, planar rolling surface for the connected run surface elements.

In the region of the guide channel elements and flanges, it is furthermore possible to embody the continuous, planar extension of the run surface elements as follows:

The excess length of the run surface element initially starts with the length of the guide channel segment and comprises the width and/or thickness of at least one connected flange. It is furthermore possible to provide an excess length which simultaneously covers the two connected flanges, wherein the fronts of the run surface elements in that case are provided with at least one chamfer in the region of the separating plane between two channel sections.

A certain excessive length measure can be provided in this case as well for the individual, adjoining run surface elements, as compared to the strictly required length measure based on the length of the guide channel segment and/or the width of the flange or the flanges, wherein impact forces on the run surface elements can develop in the fully assembled state as a result of this allowance, which leads to a slight, uniform bulging that counteracts wear or prevents loosening during the operation. That is to say, the guide roller moving between two run surface elements is always ensured a full and elastic guidance.

The running surfaces are respectively dimensioned on the one hand so as to precisely match the length of the guide channel segments and, on the other hand, to match precisely the width of the flanges. The individual components which form the channel sections for the conveying arrangement in the fully assembled state, thus comprise individual, measured lengths of run surface elements, on the one hand relative to the length of the guide channel segment and, on the other hand, relative to the width of the flanges. The continuous, planar extension of the rolling surface in the region of the individual separating planes is created by providing corresponding chamfers thereon.

The individual, adjoining run surface elements are in this case also embodied with a certain excessive length measure as compared to the strictly required length measure based on the length of the guide channel segment and/or the width of the flange, thus making it possible in the fully assembled state for impact forces that act upon the run surface elements to develop based on the allowance, which impact forces result in a slight, uniform bulging that prevents wear or loosening during the operation. That is to say, the guide roller moving between two run surface elements is always ensured a full and elastic guidance.

Assembling the individual elements to form an operating conveying arrangement requires that relative to the guide channel segments, the adjoining flanges are centered with respect to the course of the run surface elements, so as to result in continuous, planar transition conditions at the separating planes between the guide channel segment and the flange with respect to the rolling surface formed by the run surface elements.

A conveying arrangement of this type is advantageously operated jointly with a transport member that essentially consists of a number of functional units that can be connected to each other. A functional unit consists of at least two chain links, arranged essentially sequentially along the conveying section, which form a rigid and/or articulated connection with each other. The functional unit itself consists of a first chain link and a second chain link with differing functions, wherein these links are operatively connected. In the sequence for forming a conveying element, the functional units are embodied congruent or quasi-congruent or the like, or are configured differently according to their functionality, wherein the functional units are provided with means or connecting elements for a detachable connection, or a conditionally detachable connection as a result of a force-fit, and/or a non-detachable connection. Reference is again made to the aforementioned document WO2011/060560 A3 in connection with the operation of such a conveying arrangement.

BRIEF DESCRIPTION OF THE DRAWINGS

The invention is explained in the following with reference to the drawing to which we point for all details essential to the invention and not further emphasized in the specification. All elements not necessary for the direct understanding of the invention have been omitted. The same elements in the different Figures are given the same references.

Shown in the drawing are.

DETAILED DESCRIPTION

Figure 1:
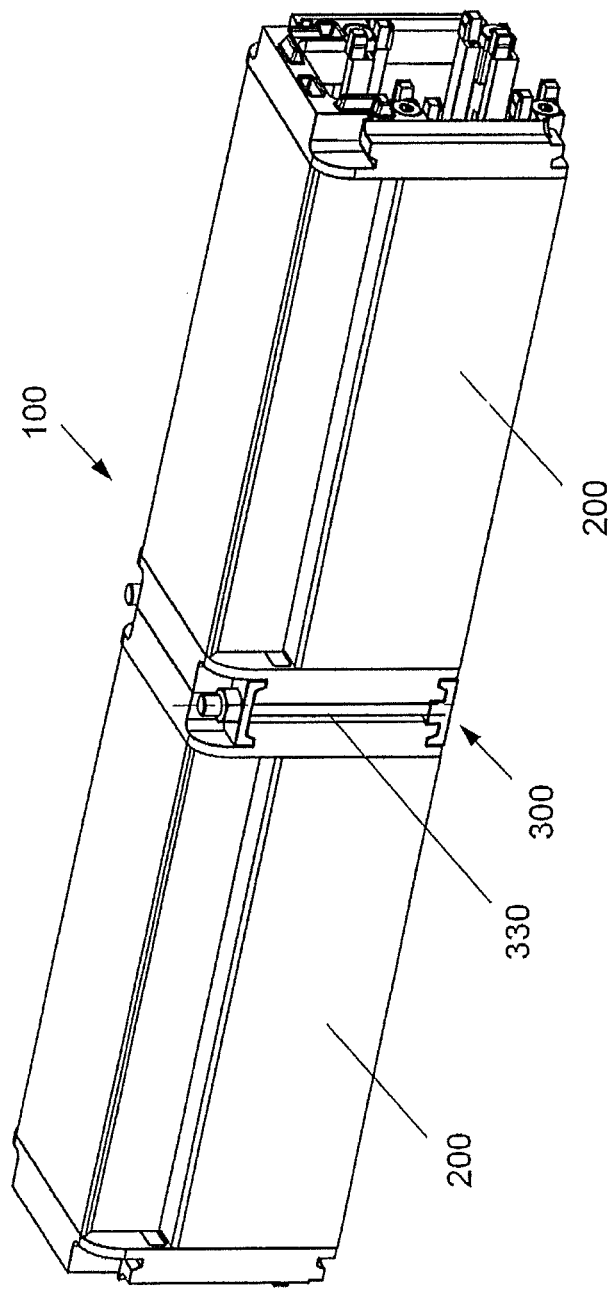
FIG. 1 A perspective view of a conveying arrangement composed of guide channel segments.

Referring to FIG. 1, there is shown a conveying arrangement 100 which essentially comprises straight-line guide channel segments 200, extending along a conveying section, as well as connecting elements which are referred to on the whole as connecting elements 300 and are used for connecting segments 200. The straight-line configuration shown herein, however, should not be understood to extend over the complete conveying arrangement. A straight conveying section can be followed without problem by curved sections extending in the plane or in three-dimensional space. In principle, twisted conveying sections can also exist. The guide channel segments 200 form individual tunnel-shaped segments, having end faces that are provided with connecting elements 300 which, in turn, are connected to each other, wherein these connecting elements are embodied as flanges 310, 320 (see FIGS. 2, 3). A detachable, force-locking connection shown is preferably provided in this case, which offers the best possible flexibility with respect to a rolling surface of a run surface element (see FIGS. 6 and 7).

Figure 2:
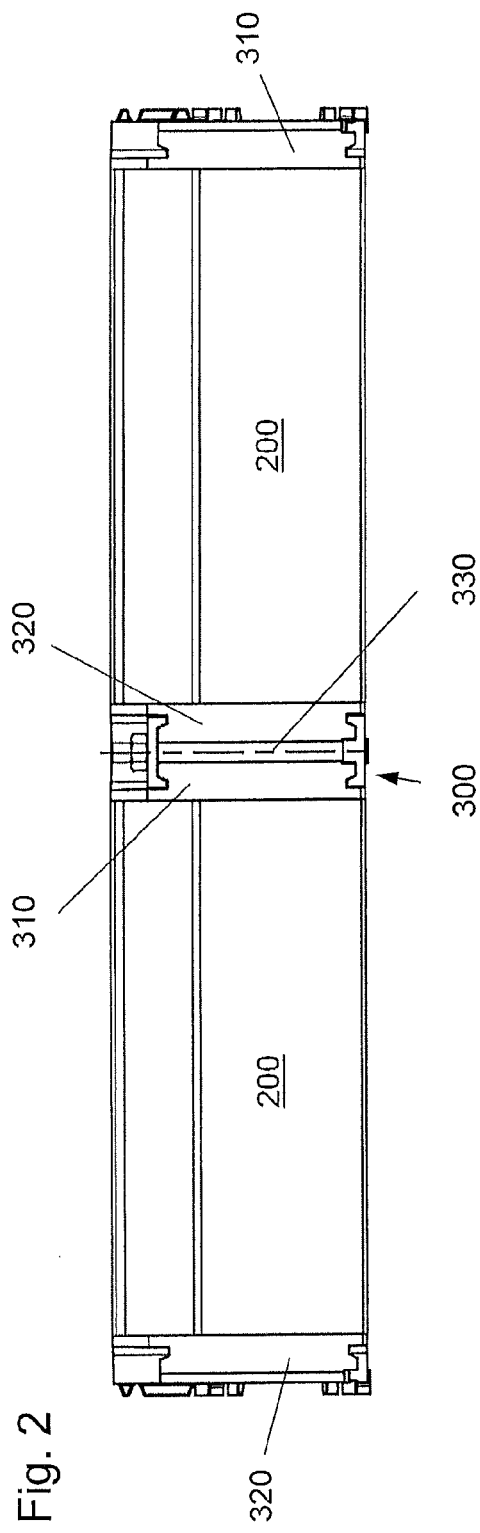
FIG. 2 A longitudinal section of the conveying arrangement according to FIG. 1, in the fully assembled state.

FIG. 2 shows a longitudinal section through two joined guide channel segments 200, including the two flanges 310, 320 which are respectively provided with end stops on the front. The force-locking connection between the two adjacent flanges 310, 320, may be, for example, a screw connection 330 on the end face, which will be explained in further detail below.

The flanges 310, 320, mounted on the ends of the guide channel segments 200 that face each other, are provided with opposite arranged raised and/or recessed elements that engage form-locking. A connecting element of this type is shown in further detail in FIG. 3. The connection between the two flanges is by way of a lateral screw connection, wherein we point to the FIGS. 6 and 7 of the US2013/0001051 A1 for a better understanding.

Figure 3:
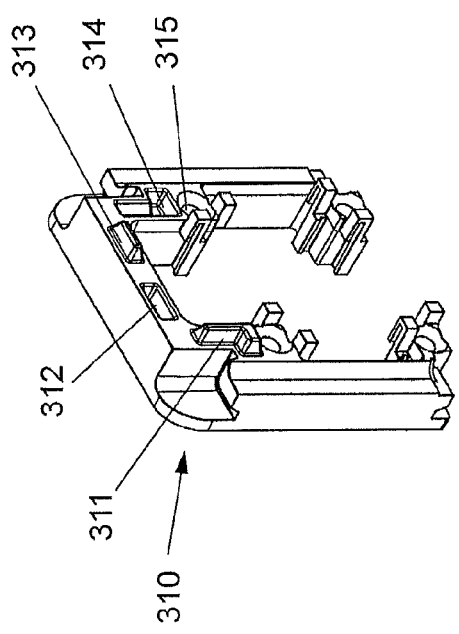
FIG. 3 A perspective view of a flange used as a connecting element as shown in FIGS. 1 and 2.

FIG. 3 shows a three-dimensional view of the connecting element in the form of a flange 310. It is obvious from FIG. 3 that a projection 311, formed onto one contact surface, engages in a depression 314 provided in the opposite-arranged contact surface of the connected flange. The projection 311 comprises a three-dimensional, vertical guide which is expanded by a horizontally projecting nose. The yoke surface of the flange 310 furthermore comprises two additional centering means 312 and 313, which also function as described in such a way as to exercise a guiding and centering function.

The projections 311, 313 as well as the depressions 312, 314 are embodied mirror-inverted and three-dimensional, with contours which are tapered on all sides. As a result, the assembly is simplified and an optimum centering effect is simultaneously also achieved. As mentioned in the above, the respective flange 310 or 320 is connected with the aid of a screw connection 315 to the respective guide channel segment 200, wherein countersunk screws are preferably used which do not affect the stop surface for the axial positioning.

Figure 4:
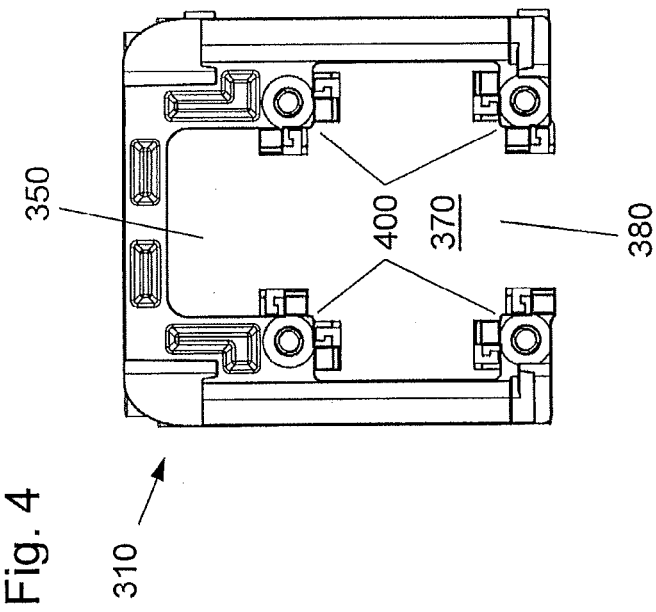
FIG. 4 An end view of the flange according to FIG. 3.

FIG. 4 shows the frontal area of the flange 310 according to FIG. 3. The inside openings 350, 370, 380, which are embodied so as to form a tunnel, correspond essentially to the channel-type design of the guide channel segment 200. For that reason, the following description of the flange for the most part can also refer to the guide channel segment 200.

With respect to the guide channel segments 200, the conveying arrangement 100 according to the invention has a central guide channel 370, a drive channel 350 on the top, and a slot-type opening 380 on the bottom. As a result of the latter, a space is provided for moving the transport members for the printed products to the outside.

Figure 6:
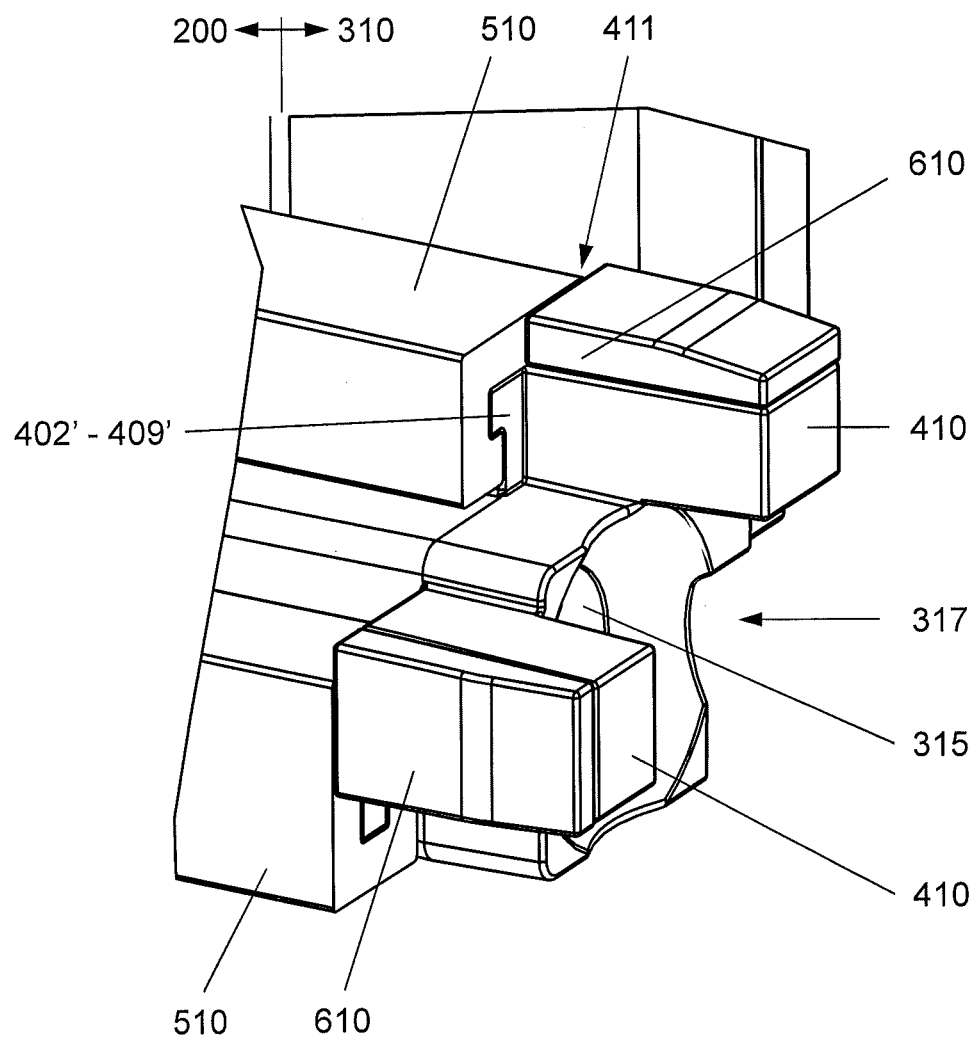
FIG. 6 The assembly of the guide channel segment with the flange, using adapter elements according to an embodiment of the invention.
Figure 7:
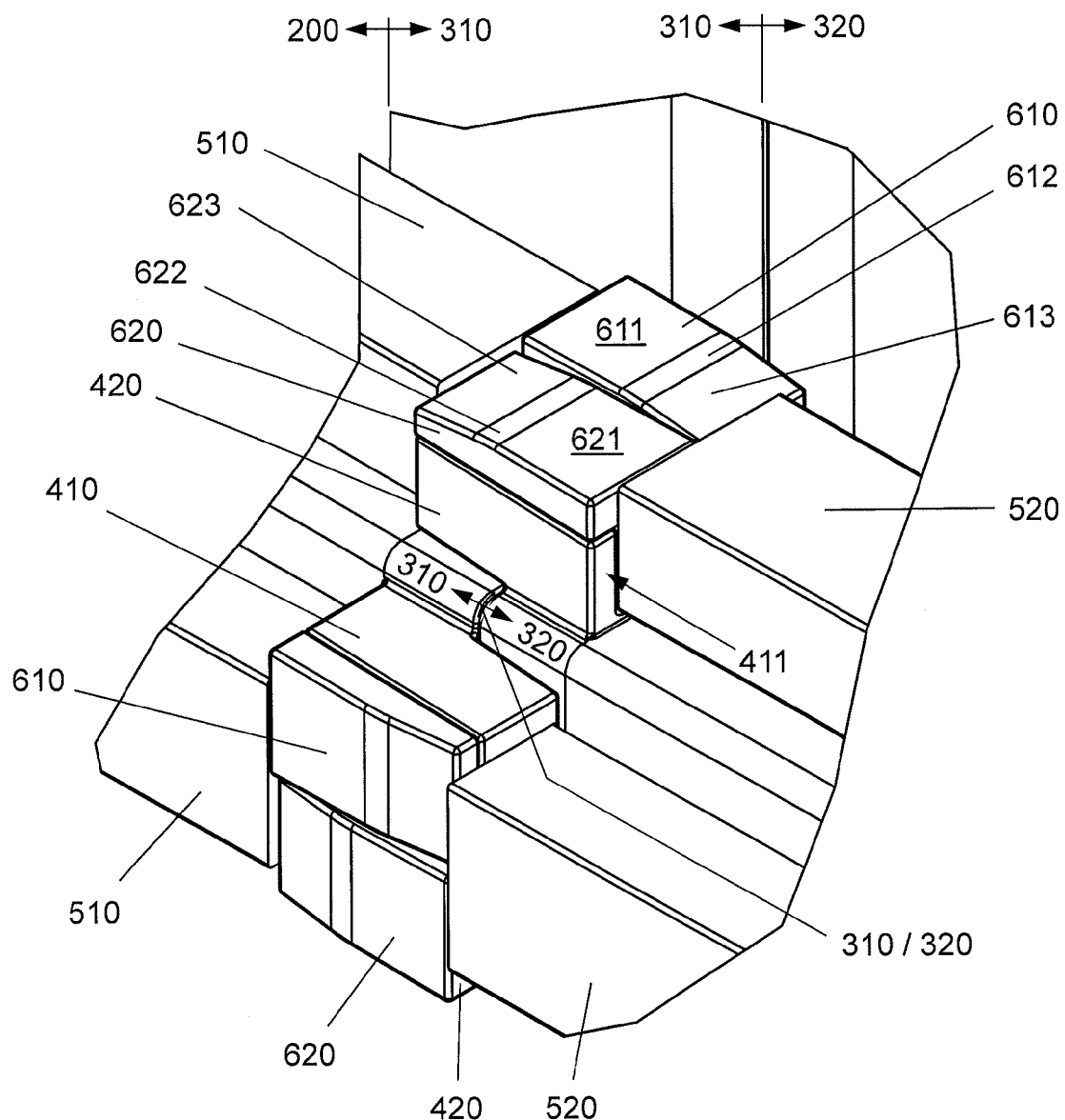
FIG. 7 The assembly of two guide channel segments with the respective flanges showing one embodiment of a planar transition of the run surface elements in a region of the separating plane between flanges.

According to FIG. 4, guide rail elements are attached on the inside of the flange 310, 320 in the region of the central guide channel 370. These guide rail elements are given the joint reference 400, extend along the individual guide channel segments 200 and the affixed flanges 310, 320, and function to accommodate rail elements and adapter elements which thus ensure a continuous, planar transition between the running surfaces of, for example, flange 310 and the adjacent guide channel segments 200 (see also FIG. 5). This is achieved by providing the adapter elements with rolling surface sections which are chamfered in counter directions and/or are slanted in conveying direction, as shown in FIGS. 6 and 7.

Figure 5:
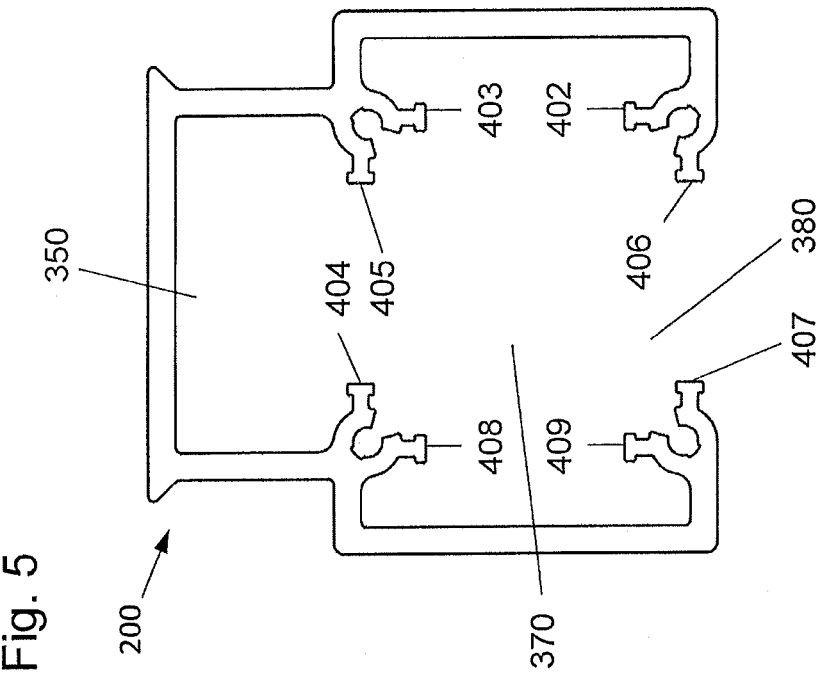
FIG. 5 A vertical section through one of the guide channel segments shown in FIG. 2.

FIG. 5 shows a profile of a guide channel segment 200 for a conveying arrangement 100. It should be emphasized here that this is only one example for such a profile and that changes can be made case-by-case, either relating to the outer geometry and/or to the design of the inside tunnels, wherein these changes do not affect the basic design of the conveying arrangement 100.

As can be seen in FIG. 5, the guide channel 370 has an essentially square cross section, wherein four pairs of support regions 400 are provided at the corners of the guide channel 370, which are formed by the guide rail elements 402 to 409 and function to accommodate the run surface elements. In this connection, reference is made to FIGS. 14, 15 of the above mentioned International Patent Publication NO. WO2011/060560, incorporated herein by reference.

The support regions 400, respectively the guide rail elements 402 to 409, essentially take the form of T profiles that extend along the conveying section, so that the rail-shaped run surface elements can easily be fitted on (see FIGS. 6 and 7), wherein it is preferable to have tolerance values that result in a moderate frictional or force-lock connection, so that the force required to fit on the profiles can be generated manually without problems.

FIG. 6 illustrates the assembly of a guide channel segment 200 with a flange 310. Visible is the separating plane 200/310 between these two elements, wherein the guide channel segment 200 and flange 310 are screwed together via the bore 315, shown herein. As compared to the individual guide rail elements 402'-409', which form the geometric continuation of the guide rail elements 402-409 along the guide channel segment 200, the flange 310 is provided with respectively one support 410 that is embodied such that an adapter element, embodied as transition piece 610, can be fitted on in installation direction 317 of the flange 310. The run surface element 510, visible in FIG. 6, forms the continuation of the run surface element mounted inside the guide channel segment 200.

The length of the run surface element 510 which extends past the end of the guide channel segment 200 corresponds at least to the distance to the respective end stop 411 inside the flange 310 that is connected to the guide channel segment. The transition section of the run surface element 510, formed to extend over the separating plane 200/310 between the guide channel segment 200 and the flange 310, consequently does not cover the complete width of the flange 310 along the rolling surface. The end stop 411 which is determined by the support 410 makes it possible to precisely determine the length of the installed run surface element 510, thus making it possible to achieve a perfect planar transition of the rolling surface because it is guided continuously over the delicate separating plane 200/310. Of course, it is also possible to have respectively one excess length of the run surface element on each side of the guide channel segment 200, which causes the two connected flanges to form a perfect planar transition for the rolling surface, relative to the guide channel segment in the region for all separating planes.

This excess length for the run surface element can be provided with a further allowance which exerts in the installed state, meaning once the flanges are connected force-locking to the guide channel segment 200 to form a channel section, a pressure on the run surface element in the running direction 317 that leads in the axial direction to a slight, uniform bulging in the run surface element 510 along the complete channel section, thereby making it possible to prevent wear or loosening during the operation. That is to say, the guide roller which is guided between two run surface elements can always roll off with total surface contact and elastic guidance.

If only one end stop 411 within the flange 310 is used during the operation, a transition section extends to the end of the flange which is formed by the previously mentioned support 410, as shown in FIG. 6. In principle, this transition section is bridged with the aid of an adapter element to ensure a continuous, planar extension of the run surface element for the further course of the flange. Thus, if adjacent flanges are respectively provided with one end stop, the individual adapter elements must be embodied such that they not only guarantee the continuous, planar extension of the run surface element, starting with the end stop and extending to the separating location for the adjacent flanges, but such that they can ensure especially in this separating location for both flanges the aforementioned maximized, uninterrupted planar extension of the rolling surface.

It follows from FIG. 7 that the adapter element consists of two transition pieces 610, 620, which are operatively connected to each other and cover the transition sections for both flanges 310, 320, such that the carrying supports 410, 420, arranged on the side relative to the adapter elements, extend over the separating plane for both flanges 310, 320, thus uniformly extending over the transition sections for both flanges via the two adapter elements 610, 620 that are embodied as transition pieces, wherein the elements 410 (support), 510 (run surface element), 610 (adapter element) belong to the flange 310 while the elements 420 (support), 520 (run surface element), 620 (adapter element) belong to the flange 320.

The adapter elements 610, 620, arranged on the side, are provided with a counter-directed, side-reversed chamfer in the running direction. The adapter element 620 is provided with a planar rolling surface 621 opposite the rolling surface of run surface element 520 on the other side of the end stop 411 formed by support 420 for the run surface element 520. This is followed by a rounded, short zone 622, which transitions to a moderately slanted section 623 that can function to even out possible height differences to the planar rolling surface of the adjacent run surface element 510 of the flange 310.

The adapter element 610 is also provided with such a chamfer which, however, is embodied in the counter direction. As a result, the rolling surfaces of the complementary run surface elements 510, 520 transition over at least half their width and with maximum flatness to the rolling surface 611, 621 for the respective adapter element 610, 620. A chamfer of this type furthermore has the advantage that a slightly raised roll of the transport member (see US2013/0001051 A1; FIGS. 14, 15) can roll off in the center of the separating line, which extends in the longitudinal direction, between both adapter elements 610, 620, thus also making possible in this region a gentle rolling behavior of the transport member passing over the separating planes and joints between the individual joined elements.

Figure 7A:
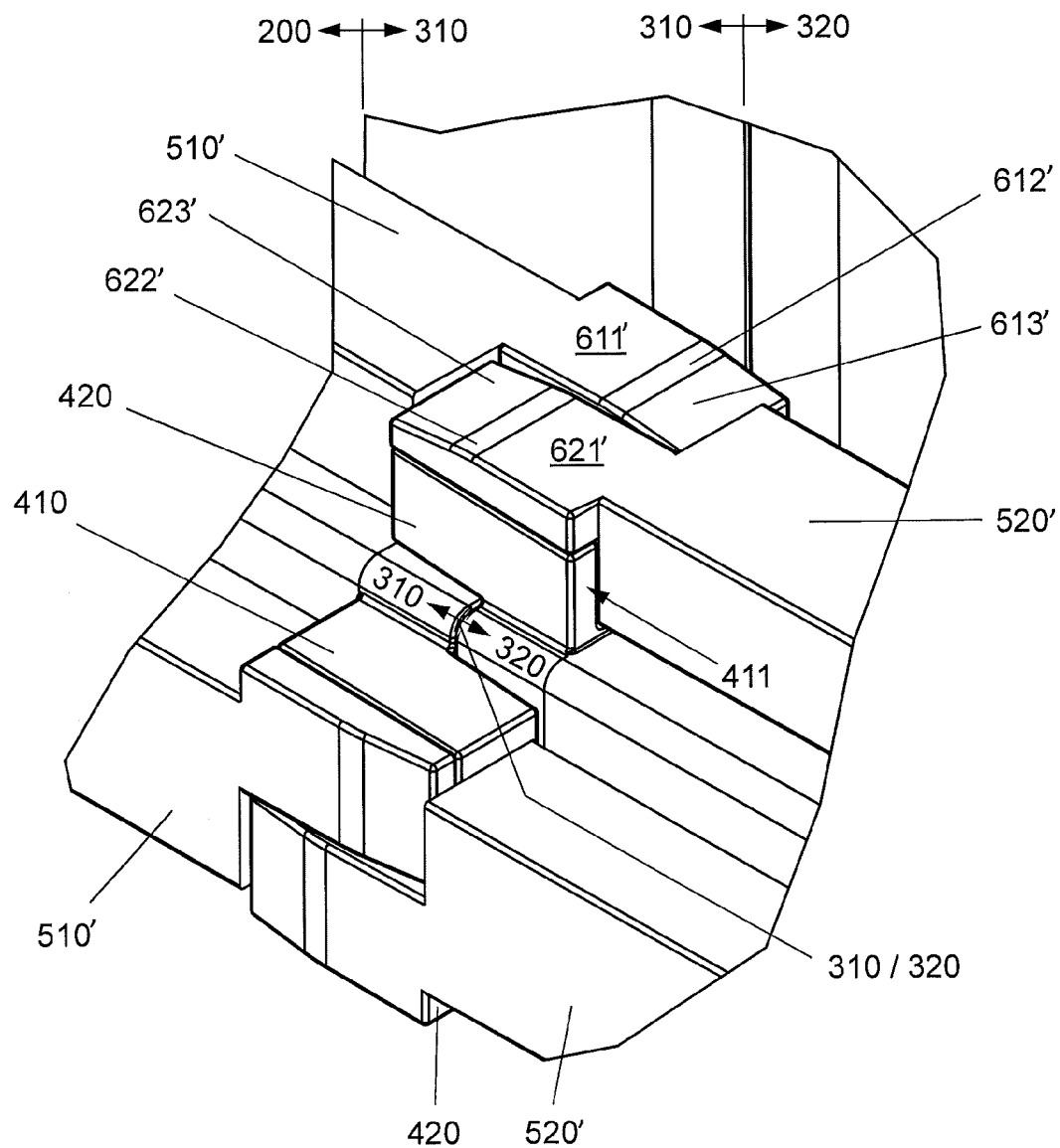
FIG. 7a The assembly of two guide channel segments with the respective flanges showing another embodiment of a planar transition of the run surface elements in a region of the separating plane between flanges.

According to the embodiment illustrated in FIG. 7a, it is furthermore possible to provide continuous, planar extension of the run surface elements 510', 520', such that the excess length of the run surface element initially starts with the length of the guide channel segment and comprises the width and/or thickness of at least one connected flange. The front of each run surface element 510', 520' may include a rolling surface 611', 621', respectively, followed by followed by a rounded, short zone 612', 622', respectively, which transitions to a moderately slanted section 613', 623', respectively, in the region of the separating plane between the flanges 310/320. The excess length of the run surface element combined with the chamfer presents a continuous, planar transition of the rolling surface for the run surface elements that serve the transport member.

It is furthermore possible to provide an excess length which simultaneously covers the two connected flanges, wherein the fronts of the run surface elements in that case are provided with at least one chamfer in the region of the separating plane between two channel sections.

A certain excessive length measure can be provided in this case as well for the individual, adjoining run surface elements, as compared to the strictly required length measure based on the length of the guide channel segment and/or the width of the flange or the flanges, wherein impact forces on the run surface elements can develop in the fully assembled state as a result of this allowance, which leads to a slight, uniform bulging that counteracts wear or prevents loosening during the operation. That is to say, the guide roller moving between two run surface elements is always ensured a full and elastic guidance.

Figure 8:
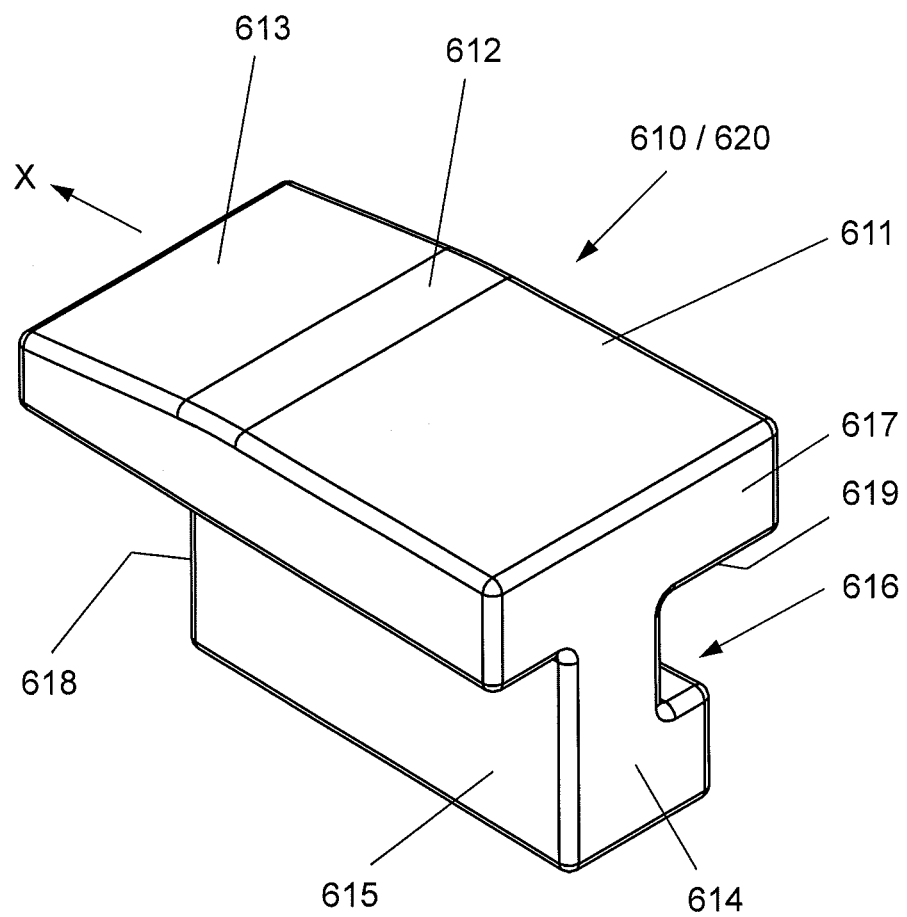
FIG. 8 A three-dimensional representation of a transition segment, as shown in FIGS. 6 and 7.

FIG. 8 shows the geometric design of a transition piece 610 and/or 620 which is operatively connected to the supports 410 and 420, as shown in FIGS. 6 and 7. The geometric contour of the transition piece 610 and/or 620 is designed such that it can be inserted and/or fitted onto a mirror-inverted inside contour of the support, wherein the tolerances of both contours relative to each other are such that a position-stable force-locking connection results. The stable position of the installed transition piece 610 and/or 620 is furthermore aided in that it is axially clamped in with the ends of the run surface elements 510 and/or 520 (see also FIG. 7). When describing the contour according to FIG. 8, the focus is on the transition piece 610 with respect to the position. The same is true, however, for the mirror-inverted transition piece 620.

The transition piece has an essentially T-shaped profile 614 which is provided in axial direction X on the one side 615 with a smooth web, extending substantially at a right angle relative to the upper plate of the T profile shape, while the web on the opposite side is provided in the vertical direction with an intermediary, trapezoid recess 616, pointing toward the inside, which extends in axial direction X along the complete transition piece. The surface formed by the recess 616 can extend in X direction parallel to the surface 619 on the underside of the plate thickness 617, or it can assume any optional positive or negative slant relative to this surface 619, wherein the counter contour in the support then must have a corresponding profiling. Viewed three-dimensionally, the guidance of the transition piece in the counter contour for the support is ensured, on the one hand at least by the web width 614, including the offset 616, and on the other hand by the plate thickness 617 of the T profile which is operatively connected without play to the support surface as a result of the recess 616.

The front edge 618 forms the stop edge opposite a specified stop location within the support, so that the two ends of the transition piece in X direction have a defined position as compared to the adjoining ends of the run surface elements. The course of the surface 611, 612 and 613 on the transition piece has already been described with the aid of FIG. 7.

The contour shown herein for the transition piece according to FIG. 8 must be understood as the preferred variant, wherein other advantageous profiles can also be used without problems.

A further component of the invention is that a contour and/or profile of the type as shown in FIG. 8 can also be provided without problem for one-piece adapter elements.

The invention has been described in detail with respect to various embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A conveying arrangement for use with a transport member that traverses inside the conveying arrangement along rollers to convey product in a conveying direction along a conveying section, the conveying arrangement comprising:
a plurality of guide channel segments connected together in the conveying direction, each guide channel segment being tunnel shaped in the conveying direction and having end flanges via which the guide channel segments are connected together, the guide channel segments each having an underside including a continuous opening in the conveying direction to accommodate a device to take over a conveying of the product along the conveying arrangement, wherein the interior of the guide channel segments and flanges includes guide rail elements;
run surface elements supported on the guide rail elements and presenting a rolling surface for the transport member, wherein at least one run surface element has an excess length, relative to the length of the respective guide channel segment, wherein the excess length of the run surface element belonging to a guide channel segment extends at least up to a stop location within the flange that is connected to the guide channel segment and that a transition section is formed that extends from the stop location to the end of the flange; and
at least one adapter element associated with the at least one run surface element fixed between adjacent flanges and comprising a two transition pieces arranged adjacent to one another along the moving direction of the transport member, at least in the region of a separating plane between the adjacent flanges, which operate jointly and integrally cover the transition distances of both flanges up to the respective end stop location for the run surface elements in the flange;
wherein the excess length of the run surface element combined with the transition pieces present a planar transition for the rolling surface of the at least one run surface element.

2. The conveying arrangement according to claim 1, wherein the guide rail elements are arranged at least on a side wall of the guide channel segment.

3. The conveying arrangement according to claim 2, wherein the run surface elements are connected at least force-fitting with the guide rail elements.

4. The conveying arrangement according to claim 1, wherein the excess length of the run surface element belonging to a guide channel segment extends over at least one end of the guide channel segment, such that a portion of the run surface element that extends over the guide channel segment in part forms the continuous, uninterrupted extension of its rolling surface within the adjoining flange.

5. The conveying arrangement according to claim 1, wherein the excess length of the run surface element belonging to a guide channel segment extends past each end of the guide channel segment, such that the excess lengths on both sides of the guide channel segment form at least in part the continuous, uninterrupted extension of the rolling surface for the run surface elements within the adjoining flanges.

6. The conveying arrangement according to claim 1, wherein the excess length includes an additional allowance in length, relative to the distance up to the stop location in the connected flange to exert a pressure on the run surface element in the running direction that leads in the axial direction to a slight, uniform bulging in the run surface element.

7. The conveying arrangement according to claim 1, wherein the transition section is equipped with the adapter element which, starting with the stop location, forms the additional, continuous and planar extension of the rolling surface formed by the run surface element.

8. The conveying arrangement according to claim 1, wherein the adapter element involves two adjacent flanges and that the adapter element forms the planar, continuous extension of the rolling surface formed by the run surface element, ranging from one stop location to the other stop location in the flanges.

9. The conveying arrangement according to claim 8, wherein the at least one adapter element includes an adapter element operatively arranged on each flange and that adjacent adapter elements abut at the separating plane for the adjacent flanges or merge into each other.

10. The conveying arrangement according to claim 1, wherein the adapter elements are configured to have a mirror-inverted chamfer at the joining location which is one of straight or at an angle, relative to the separating plane.

11. The conveying arrangement according to claim 1, characterized in that each transition piece is operatively connected to a flange.

12. The conveying arrangement according to claim 1, wherein each transition piece extends over the separating plane of adjacent connected flanges.

13. The conveying arrangement according to claim 12, wherein the two adjacent transition pieces have a run surface width that is nearly the same as the run surface width of the run surface element.

14. The conveying arrangement according to claim 1, wherein the adjacent transition pieces include, respectively on one end, a chamfer, which are arranged side-reversed and counter-directed in the moving direction of the transport member.

15. The conveying arrangement according to claim 14, wherein the chamfer extends over at least a portion of the length of the transition piece.

16. The conveying arrangement according to claim 1, wherein the adapter element or at least one transition piece has an essentially T-shaped profile with at least one web extending at a right angle relative to an upper plate of the T-shaped profile and at least one inward-pointing recess.

17. The conveying arrangement according claim 1, wherein adjoining flanges at the separating planes are centered relative to each other, such that a continuous planar transition of the rolling surfaces is ensured at the joining locations between the adapter elements and the adjoining run surface elements.

18. The conveying arrangement according to claim 1, wherein on a side wall of the guide channel segment, two opposite-arranged, spaced apart support regions are arranged for accommodating, respectively, first and a second run surface elements, on an opposite wall two opposite arranged and spaced apart support regions are arranged for accommodating, respectively, third and fourth run surface elements, that respectively adjacent to each side wall support region additional, opposite-arranged support regions are arranged at a right angle for accommodating, respectively, fifth and sixth run surface elements, and, respectively, seventh and eighth run surface elements, for which the run surfaces are respectively arranged at an angle to the adjacent run surface element, and that the first and second run surface elements, the third and fourth run surface elements, the fifth and sixth run surface elements, and the seventh and eighth run surface elements are arranged in pairs opposite each other and spaced apart.

19. A transport member for use with the operation of a conveying arrangement according to claim 1, wherein the transport member comprises a number of functional units connectable to each other, each functional unit comprising at least two chain links arranged sequentially along the conveying section, wherein the chain links are connected together either rigidly or articulated to each other, wherein each functional unit comprises a first chain link and a second chain link which serve different functions and are operatively connected, wherein in order to form a conveying member, the sequentially arranged functional units are configured congruent or quasi congruent, or have a different design with respect to functionality, and wherein the functional units are one of detachable, conditionally detachable as a result of a force-fit connection, or are non-detachable relative to one another.

20. A conveying arrangement for use with a transport member that traverses inside the conveying arrangement along rollers to convey product in a conveying direction along a conveying section, the conveying arrangement comprising:
a plurality of guide channel segments connected together in the conveying direction, each guide channel segment being tunnel shaped in the conveying direction and having end flanges via which the guide channel segments are connected together, the guide channel segments each having an underside including a continuous opening in the conveying direction to accommodate a device to take over a conveying of the product along the conveying arrangement, wherein the interior of the guide channel segments and flanges includes guide rail elements;
run surface elements supported on the guide rail elements and presenting a rolling surface for the transport member, wherein each run surface element has a length determined in dependence on the respective length of the guide channel segment and the flange, and wherein a front of respective run surface elements includes a chamfer in a region of a separating plane for the individual, connected guide channel segments and the flanges;
wherein the length of the run surface element combined with the chamfer present a planar transition for the rolling surface of the at least one run surface element.

21. The conveying arrangement according to claim 20, wherein the individual run surface elements include an excess length relative to the length of the respective guide channel segment.

22. The conveying arrangement according claim 20, wherein adjoining flanges at the separating planes are centered relative to each other, such that a continuous planar transition of the rolling surfaces is ensured at the joining locations between the run surface elements or between the adapter elements, or between the adapter elements and the adjoining run surface elements.

23. The conveying arrangement according to claim 20, wherein on a side wall of the guide channel segment, two opposite-arranged, spaced apart support regions are arranged for accommodating, respectively, first and a second run surface elements, on an opposite wall two opposite arranged and spaced apart support regions are arranged for accommodating, respectively, third and fourth run surface elements, that respectively adjacent to each side wall support region additional, opposite-arranged support regions are arranged at a right angle for accommodating, respectively, fifth and sixth run surface elements, and, respectively, seventh and eighth run surface elements, for which the run surfaces are respectively arranged at an angle to the adjacent run surface element, and that the first and second run surface elements, the third and fourth run surface elements, the fifth and sixth run surface elements, and the seventh and eighth run surface elements are arranged in pairs opposite each other and spaced apart.

24. A transport member for use with the operation of a conveying arrangement according to claim 20, wherein the transport member comprises a number of functional units connectable to each other, each functional unit comprising at least two chain links arranged sequentially along the conveying section, wherein the chain links are connected together either rigidly or articulated to each other, wherein each functional unit comprises a first chain link and a second chain link which serve different functions and are operatively connected, wherein in order to form a conveying member, the sequentially arranged functional units are configured congruent or quasi congruent, or have a different design with respect to functionality, and wherein the functional units are one of detachable, conditionally detachable as a result of a force-fit connection, or are non-detachable relative to one another.

\* \* \* \* \*